United States Patent Office 3,525,664
Patented Aug. 25, 1970

3,525,664
ABRASION RESISTANT PLASTIC LAMINATE AND METHOD OF MAKING SAME
Edward Chaloner Hale, Beaconsfield, Quebec, and Eva Yvonne Singer, Hampstead, Quebec, Canada, assignors to Domtar Limited, Montreal, Quebec, Canada, a company of Canada
No Drawing. Filed Nov. 29, 1967, Ser. No. 686,708
Int. Cl. B23b 5/16
U.S. Cl. 161—162
6 Claims

ABSTRACT OF THE DISCLOSURE

The present invention relates to a laminate comprising a plurality of resin-impregnated filler sheets and a resin-impregnated fibre containing surface sheet incorporating 20–130% silica spherules based on the dry weight of the fibres in said surface sheet.

---

The present invention relates to laminates, more particularly to laminates having a high degree of abrasion-resistance and suitable for use as flooring material, chalk board, furniture surfaces etc.

Laminates made from papers or fabrics impregnated with thermosetting resins such as urea or melamine-formaldehyde or phenol-formaldehydes and subsequently consolidated under high pressures (600 to 2,000 p.s.i.) and temperatures (approximately 150° C.) are well known. These laminates normally have abrasion-resistant surfaces produced from resin-treated papers. Usually, the surface sheet is impregnated with a melamine-formaldehyde or a modified melamine-formaldehyde resin but sometimes other thermosetting resins, such as phenol or cresol formaldehydes, polyester or epoxy resins are used.

These laminates are normally pressed against highly polished caul plates which impart a very smooth, glossy surface having a very low co-efficient of friction, thus making the laminate unsatisfactory for surfaces where anti-slip characteristics are needed. To improve the anti-slip features of these laminates, a textured surface caul plate is sometimes used in place of the polished caul, or a rough-textured release sheet may be interposed between the laminate surface and the caul plate thereby producing a laminate with a rough surface, having improved anti-slip features. The roughened surface has, however, been found to be a non-permanent solution since the laminate surface glosses over in normal wear and the anti-slip feature is lost.

To improve their anti-slip characteristics laminates have been made by;

(a) Incorporating various anti-slip abrasives into the resin formulation used for impregnating the fillers and (b) Incorporating anti-slip abrasives into the resin formulation which is then used to coat the surface sheet or sheets of the laminate.

Both the above methods impose processing difficulties in the normal method used and result in a laminate of lower quality.

Method (a) involves the use of very finely ground particles of abrasive which are mixed into the resin which must be maintained very viscous to prevent settling. Settling of the particles causes non-homogeneity of the anti-skid properties and also excessive abrasive deposition leading to areas starved of resin. Constant agitation of the resin mixture can overcome the problem of settling to some extent but results in further problems such as air entrainment etc. of its own. Also, generally large particle sizes even in ultra finely ground abrasives (down to 2–5 microns), such as silica, will cause damage to the surface of the press plates or squeeze-rolls used for resin impregnating. These particles of abrasives also tend to block the proper entry of the resins into the sheet, leading to haziness in the decorative surface, particularly at loading in excess of 20% of this solid resin. The haziness is due to the improper resin penetration leaving air inclusion around the fibres. Differences in refractive indices make the fibre visible.

The (b) method of coating referred to above overcomes the objection of poor penetration of the resin but imposes the necessity of modifying the standard equipment used for impregating the fillers and at the same time, results in generally thinner wear-layers to protect the print sheet. The use of heavy coatings, and at times even thin coatings, will normally degrade the surface rendering it more susceptible to crazing and generally leading to very brittle surfaces. The addition of fibre to the coating formulation aids in combating the crazing and brittleness problems but will alter the total wear or abrasion qualities of the surface to a limited extent. A modified fibre filled coating still poses the problem of additional equipment and processing methods.

It is therefore one of the objects of this invention to present a method of producing a laminate having anti-skid surface layers possessing homogeneity and good clarity with normal laminating process equipment.

It is a further object of the present invention to provide a laminate incorporating abrasive materials, at least in the surface layer thereof, in an amount to materially affect the wearing qualities of the laminate.

Broadly the present invention contemplates incorporation of colloidal-silica-spheres into at least the surface layers of a laminate in an amount of 20 to 130% silica based on the dry weight of the fibres and preferably above 26%. Surface sheets impregnated to contain the required amount of abrasive, together with appropriate fillers, are pressed to form a laminate with a high abrasion resistant surface suitable for use as chalk boards, furniture surfaces or flooring, depending on the amount of colloidal-silica present.

Applicant has found that colloidal-silicas formed by an ion exchange process as, for example, the colloidal-silicas disclosed in Canadian Pats. 623,562, 656,872 and 656,889 issued to Nalco Chemical Company, are very suitable for producing laminates having high wear resisting surfaces. Applicant preferably uses the colloidal-silica produced in Canada by Alchem Limited and sold under the trademark "Nalcoag 1050." "Nalcoag 1050" is a colloidal dispersion of spheres of silica formed by an ion exchange process such as those described in the above patents and containing colloidal-silica as $SiO_2$ in amounts over 49%. The particular colloidal-silica used by applicant contains silica particles in the form of spheres which are in the milli-micron size range averaging about 10 to 60 milli-microns. The colloidal dispersion of these particles has a low viscosity and relatively large quantities of silica may be incorporated into the resin bath. Other dispersions having similar properties may also be used provided they are compatible with the resin and do not interfere with the laminating procedure.

It must be noted that some other commercially available silica-particles of about the same particle size normally have high viscosity levels in the resin bath and are thus unsuitable for applicant's purpose.

It is important when incorporating the colloidal-silica into the resin bath to use a colloidal-silica of pH and viscosity compatible with the resin. When incorporating a colloidal-silica with a water soluble melamine-formaldehyde resin, applicant has found that the viscosity of the resin bath, including the colloida-sillica, should not exceed 50 cps. and preferably should be between about 20 and 40 cps. measured at 77° F. Since these colloidal dispersions of silica spherules formed by the ion exchange process may be obtained at various hydrogen ion concentrations and viscosities, it is possible to incorporate these spherules in other resin systems.

In practicing the present invention, the colloidal-silica is added to the resin in the impregnation bath and the papers are passed through this bath to pick up the required amount of resin and silica. Impregnation of the protective overlay sheet (a sheet of approximately 28 lbs. per 3,000 square feet basis weight alpha-cellulose or rayon paper) normally would be to a resin solids pick-up of 65–70% based on a treated weight at normal volatile levels. The decorative cover sheets are normally treated to a pick-up level of 40–55% solids based on treated weight, again at normal volatile levels. While these figures are representative, they are by no means limiting and it is possible to formulate for resin silica pick-ups of from about 30 to 78% with colloidal-silica levels of from about 10 to 50% based on the resin solids, and still obtain satisfactory impregnation. The higher loadings of silica of about 50% based on the resin solids showed evidence of surface cracks due to lack of sufficient resin or bonding and thus care must be taken when a high percentage of silica is incorporated. The laminate may be formed with or without a protective overlay sheet.

When using higher levels of colloidal-silica above about 15%, based on resin solids, it is desirable to incorporate a silane coupling compound into the resin bath. These coupling compounds chemically link the silica particles with the resin and considerably improve the clarity of the laminated treated overlays and they also, surprisingly, provide an aid to penetration of the resin and silica into both the overlay and/or the decorative cover. Small quantities of approximately 1%, based on the weight of the melamine resin, of the coupling compound are extremely effective in extending the range of colloidal silica that may be incorporated without leading to excessive haze in the overlay or decorative cover. These silane coupling compounds are usually amino functional silanes, tri-methoxy-silane or epoxy functional silane. One suitable coupling compound is sold under the tradename "Silane Z 6020" by Dow Corning Company Limited.

A typical formulation of a melamine resin containing colloidal-silica would be as follows:

| | Parts by weight |
|---|---|
| Melamine resin (Melolam 405) | 200 |
| Water | 250 |
| Colloidal-silica (Nalcoag 1050) | 160 |
| Silane | As required |

This particular resin colloid system yields a total solids content of 46% using 40% silica solids based on melamine resin solids.

Tables I and II given hereinbelow show characteristics of typical laminates produced in accordance with the present invention.

TABLE I.—SURFACE PROPERTIES

| Sample Table II: | Cigarette burn secs. | Hot pot | Hot water |
|---|---|---|---|
| A | 140 | No change | No change |
| B | 116 | do | Do. |
| C | 128 | do | Do. |
| D | 128 | do | Do. |

TABLE II

| | Overlay | | Cover | | 5,000 cycles wear values aver. gms./100 cycles |
|---|---|---|---|---|---|
| | Percent silica based on resin solids | Percent melamine resin based on treated weight | Percent silica based on resin solids | Percent resin based on treated weight | |
| Sample: | | | | | |
| A | 5 | 65.7 | 5 | 51.0 | .0013 |
| B | 10 | 62.7 | 10 | 49.0 | .0011 |
| C | 15 | 60.0 | 15 | 47.0 | .0014 |
| D | 20 | 57.5 | 20 | 45.0 | .0009 |
| E | (¹) | (¹) | 50 | 39.0 | ².0005 |
| F | (¹) | (¹) | 50 | 54.0 | .0003 |
| G | (¹) | (¹) | 40 | 38.5 | .0004 |
| H | (¹) | (¹) | 30 | 41.5 | .0001 |
| I | 50 | 46.0 | 0 | | (³) |
| J | 40 | 49.3 | 0 | | .0009 |
| K | 30 | 53.1 | 0 | | .0002 |
| L | (⁴) | 68 | (⁴) | 42 | .046 |
| M | (¹) | (¹) | (⁴) | 54 | .039 |

¹ No overlay.  ² Some cracking.  ³ Not tested.  ⁴ Nil.

Samples A, B and C also received a stain test using mustard, tea, iodine and red and blue ink. No change was noted on any of the samples and the stains could be washed off with warm water.

As indicated in Table I, laminates produced containing a relatively high percentage of silica still maintained the basic characteristics of thermosetting laminates. From Table II it is evident that the wear resistance (the wear value in grams per 100 cycles based on 5000 cycles), shows a wear value for the two control sheets, namely samples L and M at 0.046 and 0.039 respectively. The samples tested containing silica, materially reduced the amount of wear more than 100-fold compared with the control laminates containing no silica. It must be further noted that in samples L and M (the control laminates) the total number of cycles used to obtain the average per 100 cycles was only 2700 and 2000 cycles respectively.

While applicant has disclosed that the colloidal silica is added in the resin bath, it is evident that the papers may be pre-impregnated to the desired level of silica content and then impregnated with the laminating resin. This procedure, however, does not produce as good a laminate, since the silica particles are not as homogeneously dispersed throughout the system and a somewhat greater surface deposition of the resin itself occurs. Also the double impregnation process requires further equipment and is generally more troublesome and costly than applicant's preferred system.

Thus applicant has disclosed a laminate and a method of producing a laminate incorporating a high percentage of silica into the surface layer without detracting from the appearance of the laminate. By increasing the amount of silica incorporated to about 40%, preferably between about 10 and 35% based on resin solids, applicant is able to provide a new laminate that retains its aesthetic values while increasing the abrasive resistance qualities.

We claim:

1. An abrasion resistant plastic laminate comprising a plurality of resin-impregnated filler sheets and a fibre-containing surface sheet impregnated with a resin said filler sheets and said surface sheet being consolidated by heat and pressure, said surface sheet incorporating silica particles of a size between 10 and 60 millimicrons, said silica particles being dispersed in said resin in an amount of between 10 and 50% by weight of resin solids, said silica particles being present in said surface sheet in an amount between 20 and 130% based on the dry weight of the fibres in said surface sheet.

2. A laminate as defined in claim 1 wherein said surface sheet is impregnated with melamine formaldehyde resin.

3. A laminate as defined in claim 2 wherein said silica particles are spherules formed by an ion exchange process.

4. A laminate as defined in claim 2 wherein said surface sheet was impregnated to a resin-silica pick-up of 30–78% based on the treated weight of the sheet.

5. A method of forming an abrasion resistant plastic laminate comprising passing a fibre-containing sheet through a resin bath containing resin and incorporated therein a colloidal dispersion of silica particles in an amount between 10 and 50% based on the resin solids, said silica particles being of a size between 10 and 60 millimicrons, the pH and viscosity of said silica particles being compatible with that of the resin, thereby to impregnate said sheet to a resin silica solids pickup of between 30 and 78% based on the treated weight, and to incorporate 20–130% silica based on the dry weight of the fibres in said sheet, applying said sheet as a surface sheet on resin-impregnated filler sheets and pressing under conditions of high temperature and pressure to consolidate said laminate.

6. A method as defined in claim 5 wherein the resin in said resin bath is a melamine formaldehyde resin.

References Cited

UNITED STATES PATENTS

| | | | |
|---|---|---|---|
| 3,373,070 | 3/1968 | Fuerst | 161—79 |
| 3,380,876 | 4/1968 | Rusher | 161—162 |
| 3,316,139 | 4/1967 | Alford et al. | 161—162 XR |

PHILIP DIER, Primary Examiner

U.S. Cl. X.R.

117—28; 156—279; 161—168